(12) United States Patent
Eguchi et al.

(10) Patent No.: US 11,148,902 B2
(45) Date of Patent: Oct. 19, 2021

(54) MEDIUM TRANSPORTING DEVICE, IMAGE READING APPARATUS, AND TRANSPORTING CONTROL METHOD

(71) Applicant: SEIKO EPSON CORPORATION, Tokyo (JP)

(72) Inventors: Seiji Eguchi, Kitakyushu (JP); Takayuki Shiota, Kitakyushu (JP); Hidetoshi Masuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 16/696,309

(22) Filed: Nov. 26, 2019

(65) Prior Publication Data

US 2020/0172370 A1      Jun. 4, 2020

(30) Foreign Application Priority Data

Nov. 30, 2018   (JP) .............. JP2018-225094

(51) Int. Cl.
  *B65H 43/02*       (2006.01)
  *B65H 7/14*        (2006.01)
  (Continued)

(52) U.S. Cl.
  CPC .............. *B65H 43/02* (2013.01); *B65H 7/14* (2013.01); *B65H 29/20* (2013.01); *B65H 43/04* (2013.01); *B65H 2553/41* (2013.01)

(58) Field of Classification Search
  CPC ... B65H 7/18; B65H 7/14; B65H 7/06; B65H 7/20; B65H 29/20; B65H 43/02; B65H 43/04; B65H 2553/41; B65H 2553/414; B65H 2511/515; B65H 2511/528; H04N 1/00718; H04N 1/00694
  See application file for complete search history.

(56) References Cited

U.S. PATENT DOCUMENTS 6,952,537 B2 * 10/2005 Fujii ................. B65H 7/02
                                              399/17
7,138,620 B2    11/2006 Trisnadi et al.
(Continued)

FOREIGN PATENT DOCUMENTS

CN      101048843       9/2011
CN      105676606       6/2016
(Continued)

*Primary Examiner* — Luis A Gonzalez
(74) *Attorney, Agent, or Firm* — Workman Nydegger

(57) ABSTRACT

There is provided a medium transporting device including: a medium placement section on which a medium is placed, a feeding roller feeding a medium from the medium placement section, a motion detection sensor detects a motion of a medium, and a controller that stops feeding of a medium based on a detection value received from the motion detection sensor, in which the motion detection sensor is a two-dimensional sensor including a light emitting section and a light receiving section and detecting a motion of a medium, the medium placement section is provided with a placement detector that acquires information relating to a presence/absence of a medium on the medium placement section, and the controller sets a state of the light emitting section to a non-light emitting state when detection information of the placement detector indicates that a medium is absent on the medium placement section.

10 Claims, 10 Drawing Sheets

(51) Int. Cl.
  *B65H 29/20* (2006.01)
  *B65H 43/04* (2006.01)

(56) References Cited

U.S. PATENT DOCUMENTS

| | | | |
|---|---|---|---|
| 7,459,671 B2 | 12/2008 | Trisnadi et al. | |
| 9,467,586 B2 | 10/2016 | Hata et al. | |
| 10,038,803 B2 | 7/2018 | Hata et al. | |
| 10,322,898 B2 * | 6/2019 | Kogi | B65H 7/02 |
| 2006/0091301 A1 | 5/2006 | Trisnadi et al. | |
| 2006/0159471 A1 | 7/2006 | Yasukawa et al. | |
| 2007/0057157 A1 | 3/2007 | Trisnadi et al. | |
| 2007/0237558 A1 | 10/2007 | Nakanishi et al. | |
| 2008/0265497 A1 | 10/2008 | Kimura et al. | |
| 2016/0165086 A1 | 6/2016 | Hata et al. | |
| 2016/0381241 A1 | 12/2016 | Hata et al. | |
| 2019/0100396 A1 * | 4/2019 | Shiota | H04N 1/00694 |

FOREIGN PATENT DOCUMENTS

| | | | |
|---|---|---|---|
| JP | 2003205654 | | 7/2003 |
| JP | 2006193286 | | 7/2006 |
| JP | 2007276982 | | 10/2007 |
| JP | 2010089943 A | * | 4/2010 |
| JP | 2019029794 | | 2/2019 |
| WO | 2006050229 | | 5/2006 |

* cited by examiner

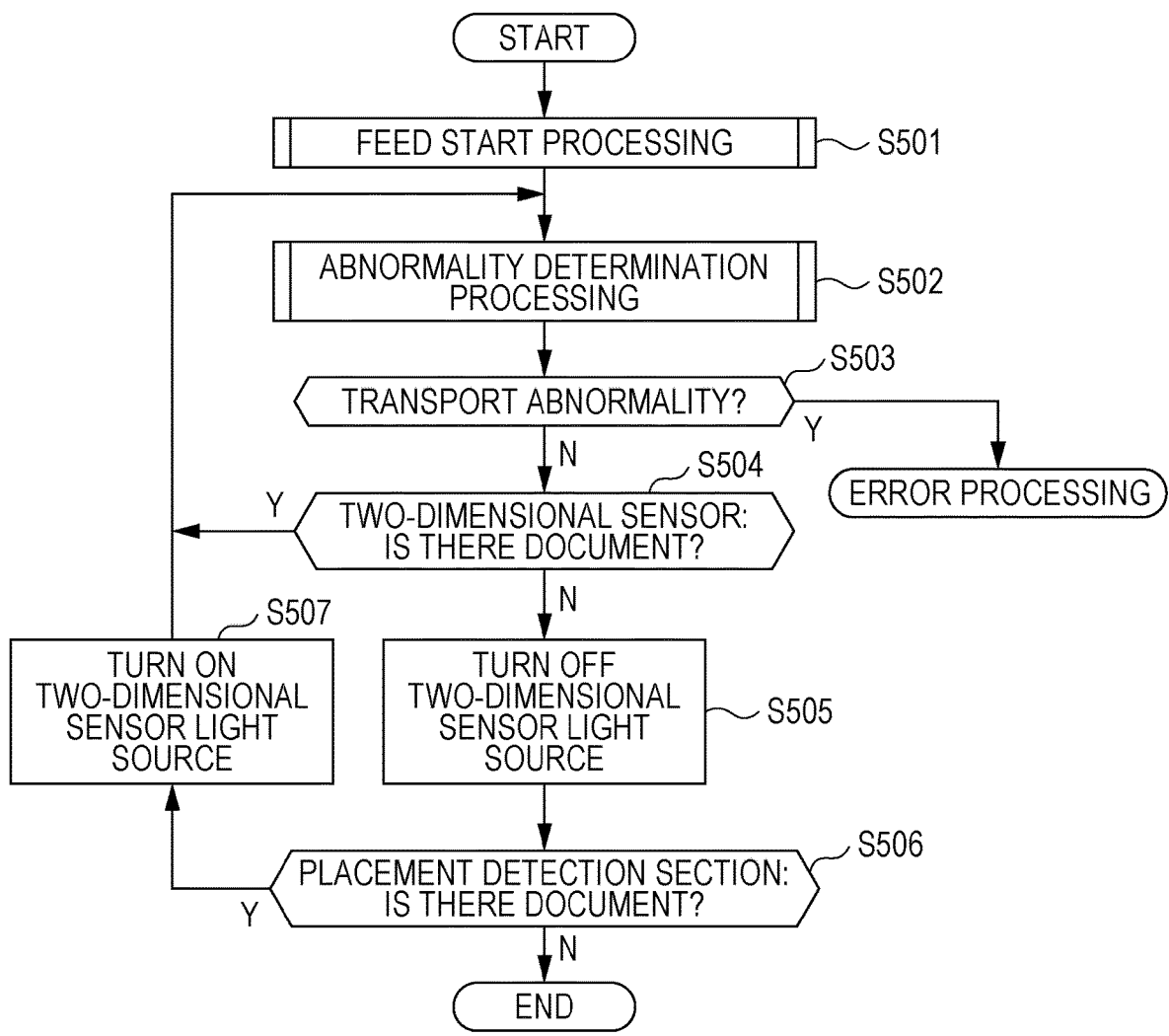

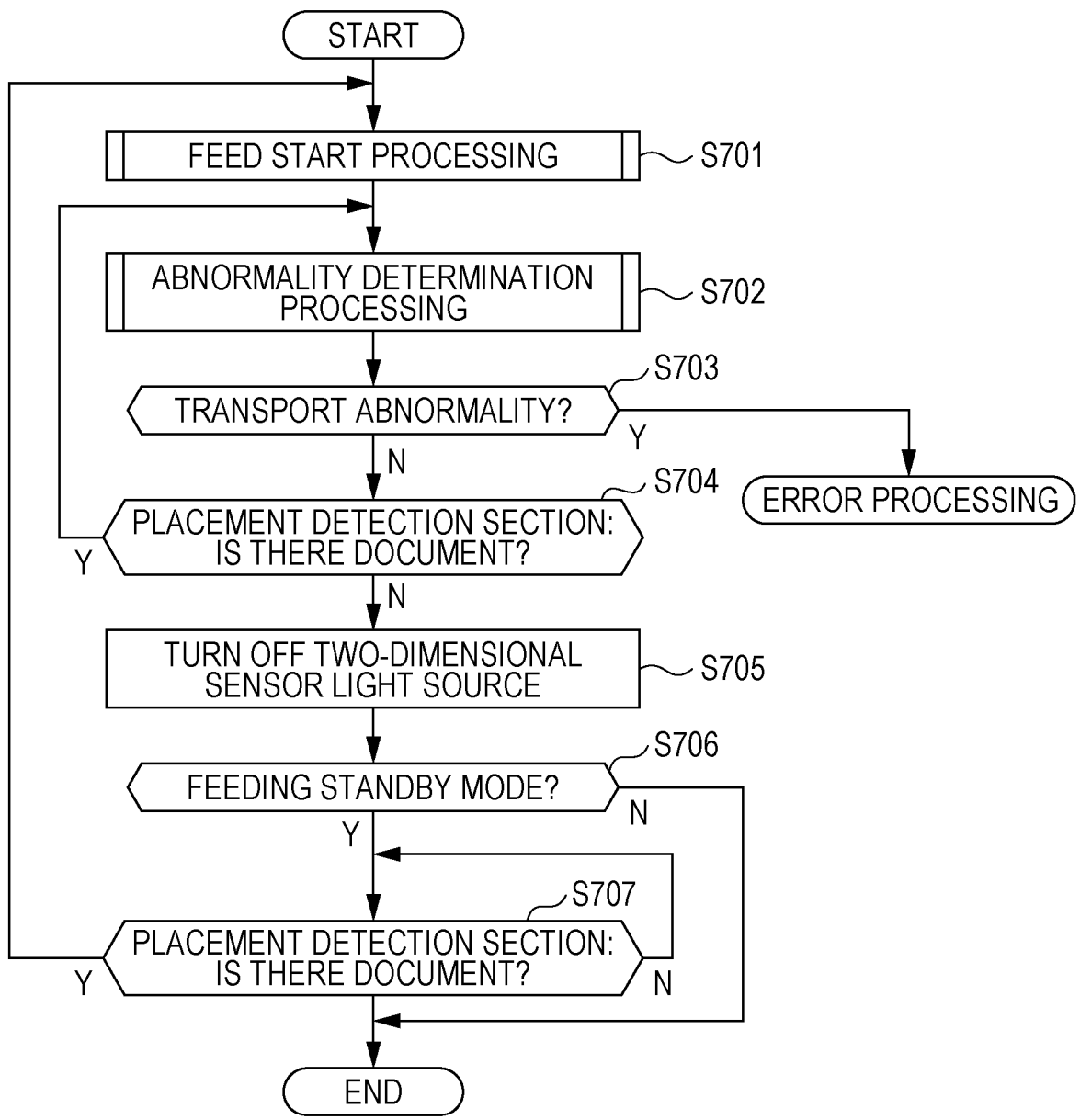

MEDIUM TRANSPORTING DEVICE, IMAGE READING APPARATUS, AND TRANSPORTING CONTROL METHOD

The present application is based on, and claims priority from JP Application Serial Number 2018-225094, filed Nov. 30, 2018, the disclosure of which is hereby incorporated by reference herein in its entirety.

BACKGROUND

1. Technical Field

The present disclosure relates to a medium transporting device that transports a medium and an image reading apparatus including the medium transporting device. The present disclosure also relates to a transporting control method in a medium transporting device.

2. Related Art

In the related art, a method of detecting skew of a medium and performing predetermined control is adopted in an image reading apparatus or a recording apparatus. For example, JP-A-2003-205654 discloses an ink jet printer configured to detect skew of a paper using a motion sensor, change a reciprocating range of the carriage according to the skew amount, and not discharge ink to a place other than paper.

The motion sensor has a two-dimensional semiconductor image sensor in which pixels are arranged vertically and horizontally. The motion sensor irradiates toward a paper from a light emitting section with light, and receives the reflected light by a light receiving section to detect vertical and horizontal movement of paper.

Here, when an abnormality occurs in paper transport, the amount of vertical and horizontal movement change as compared with the normal transport. Therefore, by detecting the change, it can be determined that an abnormality has occurred in paper transport, and the paper transport can be stopped. However, if detection light is emitted from a light emitting section when there is no paper, there is a possibility that erroneous detection may occur when a user touches the vicinity of the motion sensor, as a result, inadvertent transport stoppage is caused and the convenience of the user is reduced.

SUMMARY

According to an aspect of the present disclosure, there is provided a medium transporting device including: a medium placement section on which a medium is placed, a feeding roller feeding a medium from the medium placement section, a motion detection sensor, that is disposed at a position facing a surface of a medium, and detects a motion of a medium, and a controller that stops feeding of a medium based on a detection value received from the motion detection sensor, in which the motion detection sensor is a two-dimensional sensor including a light emitting section and a light receiving section and detecting a motion of a medium in a two-dimensional coordinate system that includes a first axis and a second axis, the medium placement section is provided with a placement detector that acquires information relating to a presence/absence of a medium on the medium placement section, and the controller sets a state of the light emitting section to a non-light emitting state when detection information of the placement detector indicates that a medium is absent on the medium placement section.

BRIEF DESCRIPTION OF THE DRAWINGS

FIG. 11 is a flowchart showing an overall flow of abnormality determination processing during document scanning.

FIG. 12 is a flowchart showing an overall flow of abnormality determination processing during document scanning.

DESCRIPTION OF EXEMPLARY EMBODIMENTS

Figure 1:
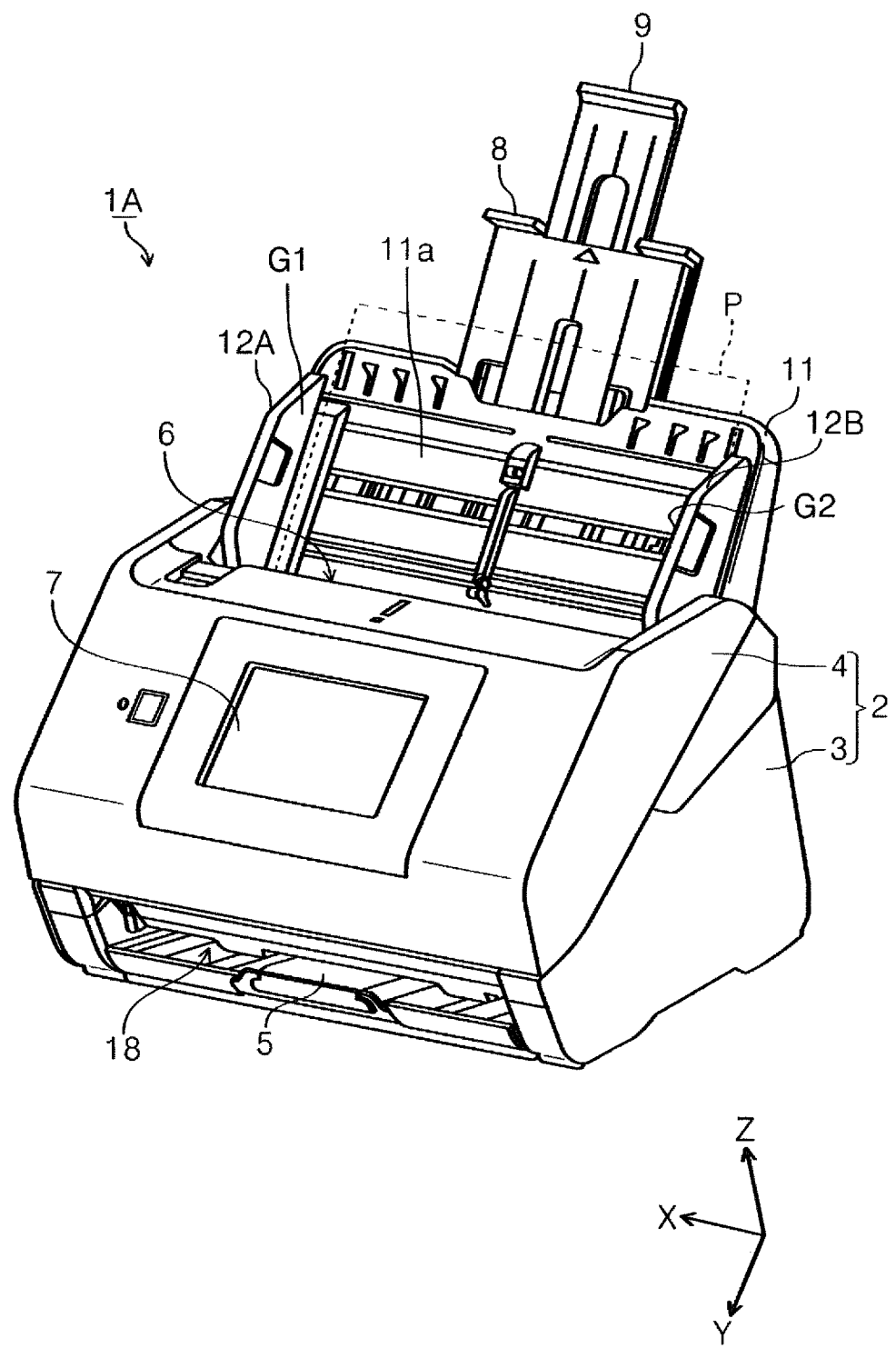
FIG. 1 is an external appearance perspective view of a scanner.

The present disclosure will be schematically described below.

A medium transporting device according to a first aspect includes: a medium placement section on which a medium is placed, a feeding roller feeding a medium from the medium placement section, a motion detection sensor, that is disposed at a position facing a surface of a medium, and detects a motion of a medium, and a controller that stops feeding of a medium based on a detection value received from the motion detection sensor, in which the motion detection sensor is a two-dimensional sensor including a light emitting section and a light receiving section and detecting a motion of a medium in a two-dimensional coordinate system that includes a first axis and a second axis, the medium placement section is provided with a placement detector that acquires information relating to a presence/absence of a medium on the medium placement section, and the controller sets a state of the light emitting section to a non-light emitting state when detection information of the placement detector indicates that a medium is absent on the medium placement section.

According to the present aspect, the medium placement section is provided with the placement detector that acquires the information relating to a presence/absence of a medium on the medium placement section, and since the controller sets the state of the light emitting section to the non-light emitting state when detection information of the placement detector indicates that a medium is absent on the medium placement section, the proper medium transport can be realized by suppressing erroneous detection due to the two-dimensional sensor.

In a second aspect according to the first aspect, a medium detection position by the placement detector may be upstream of a medium detection position by the two-dimensional sensor in a medium feeding direction.

According to the present aspect, since the medium detection position by the placement detector is upstream of the medium detection position by the two-dimensional sensor in the medium feeding direction, a period, during which the two-dimensional sensor emits light in a state where a medium is not present, may be minimized.

In a third aspect according to the first aspect, a medium detection position by the placement detector may be downstream of a medium detection position by the two-dimensional sensor in a medium feeding direction.

According to the present aspect, since the medium detection position by the placement detector is downstream of the medium detection position by the two-dimensional sensor in the medium feeding direction, the effects of the first aspect described above may be obtained.

In a fourth aspect according to the third aspect, a number of stacked sheets detector that acquires information relating to the number of stacked sheets of media on the medium placement section may be included, and the controller may set a state of the light emitting section to a non-light emitting state when detection information of the number of stacked sheets detector indicates that the number of media on the medium placement section is one.

According to the present aspect, the number of stacked sheets detector that acquires information relating to the number of stacked sheets of media on the medium placement section may be included, and since the controller sets the state of the light emitting section to the non-light emitting state when the detection information of the number of stacked sheets detector indicates that the number of media on the medium placement section is one, a period during which the two-dimensional sensor emits light in a state where a medium is not present, may be eliminated.

In a fifth aspect according to the third aspect, the controller may set a state of the light emitting section to a non-light emitting state when the detection information of the two-dimensional sensor indicates that a medium is absent on the medium placement section.

According to the present aspect, since the two-dimensional sensor functions as a section that acquires information related to the presence/absence of a medium on the medium placement section, the light emitting section may be set to the non-light emitting state before determining that a medium is absent on the medium placement section by the placement detector, thereby, a period during which the two-dimensional sensor emits light in a state where a medium is not present may be extremely shortened.

In a sixth aspect according to the fifth aspect, the controller may set a state of the light emitting section to a light emitting state when detection information of the two-dimensional sensor indicates that a medium is absent on the medium placement section and when the detection information of the placement detector indicates that a medium is present on the medium placement section.

According to the present aspect, since the controller sets the state of the light emitting section to the light emitting state when detection information of the two-dimensional sensor indicates that a medium is absent on the medium placement section and when detection information of the placement detector indicates that a medium is present on the medium placement section, even when the information relating to the presence/absence of a medium on the medium placement section by the two-dimensional sensor is incorrect, a motion of a medium may be continuously detected by the two-dimensional sensor, that is, a transport abnormality may be detected.

In a seventh aspect according to any one of the first to sixth aspects, the controller may be configured to execute a feeding standby mode that waits for feeding of a medium until detection information of the placement detector is changed to information indicating that a medium is present on the medium placement section when the detection information of the placement detector indicates that a medium is absent on the medium placement section, and the controller may set a state of the light emitting section to a light emitting state when the detection information of the placement detector is changed from information indicating that a medium is absent on the medium placement section to information indicating that a medium is present, in the feeding standby mode.

The detection information of the placement detector indicates that a medium is absent on the medium placement section when the feeding standby mode is entered, thereby, the state of the light emitting section is set to the non-light emitting state, and a motion of a medium using the two-dimensional sensor cannot be detected. However, when a medium is placed on the medium placement section in that state, the state of the light emitting section is set to the light emitting state, so that when feeding of the medium is resumed, the motion of the medium may be detected using the two-dimensional sensor, that is, it may be possible to detect a transport abnormality.

A medium transporting device according to an eighth aspect includes: a medium placement section on which a medium is placed, a feeding roller feeding a medium from the medium placement section, a motion detection sensor, that is disposed at a position facing a surface of a medium, and detects a motion of a medium, and a controller that stops feeding of a medium based on a detection value received from the motion detection sensor, in which the motion detection sensor is a two-dimensional sensor including a light emitting section and a light receiving section and detecting a motion of a medium in a two-dimensional coordinate system that includes a first axis and a second axis, the medium placement section is provided with a number of stacked sheets detector that acquires information relating to the number of stacked sheets of media on the medium placement section, and the controller sets a state of the light emitting section to a non-light emitting state when detection information of the number of stacked sheets detector indicates that the number of media on the medium placement section is one.

According to the present aspect, the medium placement section is provided with the number of stacked sheets detector that acquires the information relating to a number of stacked sheets of media on the medium placement section, and since the controller sets the state of the light emitting section to the non-light emitting state when detection information of the number of stacked sheets detector indicates that the number of media on the medium placement section is one, the proper medium transport can be realized by suppressing erroneous detection due to the two-dimensional sensor.

A medium transporting device according to a ninth aspect includes: a medium placement section on which a medium is placed, a feeding roller feeding a medium from the medium placement section, a motion detection sensor, that is disposed at a position facing a surface of a medium, and detects a motion of a medium, and a controller that stops feeding of a medium based on a detection value received from the motion detection sensor, in which the motion detection sensor is a two-dimensional sensor including a light emitting section and a light receiving section and detecting a motion of a medium in a two-dimensional coordinate system that includes a first axis and a second axis, and the controller sets a state of the light emitting section to a non-light emitting state when detection information of the two-dimensional sensor indicates that a medium is absent on the medium placement section.

According to the present aspect, when the detection information of the two-dimensional sensor indicates that a medium is absent on the medium placement section, the controller sets the state of the light emitting section to the non-light emitting state, thereby, the proper medium transport can be realized by suppressing erroneous detection due to the two-dimensional sensor.

An image reading apparatus according to a tenth aspect includes: a reader that reads a medium, and the medium transporting device according to any one of the first to ninth aspects, which transports a medium toward the reader.

According to the present aspect, in the image reading apparatus, any one of the effects of the first to ninth aspects described above may be obtained.

In a transporting control method of a medium transporting device according to an eleventh aspect, the medium transporting device includes a medium placement section on which a medium is placed, a feeding roller feeding a medium from the medium placement section, a motion detection sensor, that is disposed at a position facing a surface of a medium, and detects a motion of a medium, and a controller that stops feeding of a medium based on a detection value received from the motion detection sensor, the motion detection sensor is a two-dimensional sensor including a light emitting section and a light receiving section and detecting a motion of a medium in a two-dimensional coordinate system that includes a first axis and a second axis, and the medium placement section is provided with a placement detector that acquires information relating to a presence/absence of a medium on the medium placement section, and the transporting control method includes: setting a state of the light emitting section to a non-light emitting state when detection information of the placement detector indicates that a medium is absent on the medium placement section.

According to the present aspect, the medium placement section is provided with the placement detector that acquires the information relating to a presence/absence of a medium on the medium placement section, and since the state of the light emitting section is set to the non-light emitting state when detection information of the placement detector indicates that a medium is absent on the medium placement section, the proper medium transport can be realized by suppressing erroneous detection due to the two-dimensional sensor.

Hereinafter, the present disclosure will be schematically described.

Hereinafter, an embodiment of an image reading apparatus will be described with reference to the drawings. In the present embodiment, as an example of the image reading apparatus, a document scanner (hereinafter simply referred to as a scanner 1A) capable of reading at least one of the front and back surfaces of a document P is taken as an example.

In the X-Y-Z coordinate system shown in each figure, an X direction is an apparatus width direction, and a document width direction which is a direction intersecting a document transport direction. A Y direction is the document transport direction. A Z direction is a direction intersecting the Y direction, and generally indicates a direction that is orthogonal to a surface of the document P being transported. A+Y direction is a direction from a back surface to a front surface of the apparatus, and a−Y direction is a direction from the front surface to the back surface of the apparatus. When viewed from the front surface of the apparatus, a left direction is the +X direction, and a right direction is the −X direction. A+Z direction is an upper side of the apparatus, and a−Z direction is a lower side of the apparatus. Further, a direction in which the document P is fed (+Y direction) is called "downstream", and an opposite direction (−Y direction) is called "upstream".

FIG. 1 is an external appearance perspective view showing a scanner 1A according to the present disclosure.

The scanner 1A includes an apparatus main body 2 that includes a reading section 20 (FIG. 2) that reads an image of the document P inside.

The apparatus main body 2 includes a lower unit 3 and an upper unit 4. The upper unit 4 is provided so as to be openable/closable with respect to the lower unit 3 with the downstream in the document transport direction as a rotation fulcrum. The upper unit 4 is rotated and opened in a front surface direction of the apparatus so that the feed path of the document P is exposed and jamming processing of the document P can be easily performed.

A document placement section 11 having a placement surface 11a on which the document P to be fed is placed is provided in the vicinity of a back surface of the apparatus of the apparatus main body 2. The document placement section 11 is provided with respect to the apparatus main body 2 in an attachable/detachable manner.

A pair of edge guides for guiding side edges in the width direction (X direction) intersecting the document transport direction (Y direction), specifically, a first edge guide 12A and a second edge guide 12B are provided in the document placement section 11. The first edge guide 12A and the second edge guide 12B are provided with guide surfaces G1 and G2 for guiding the side edges of the document P, respectively.

The document placement section 11 includes a first paper support 8 and a second paper support 9. The first paper support 8 and the second paper support 9 can be housed in the document placement section 11 and can be pulled out from the document placement section 11 so that the length of the placement surface 11a can be adjusted as shown in FIG. 1.

The apparatus main body 2 includes an operation panel 7 on the front surface of the upper unit 4 device for realizing various reading settings or a reading execution operation, and a user interface (UI) that shows the content of the reading settings or the like. In the present embodiment, the operation panel 7 is a so-called touch panel that can perform both display and input, and serves as both an operation section for performing various operations and a display section for displaying various information.

A feeding port 6 connected to the inside of the apparatus main body 2 is provided on the upper part of the upper unit 4, and the document P placed on the document placement section 11 is fed toward the reading section 20 from the feeding port 6 provided inside the apparatus main body 2.

A paper discharging tray 5 for receiving the document P to be discharged is provided on the front surface side of the lower unit 3 device.

Figure 2:
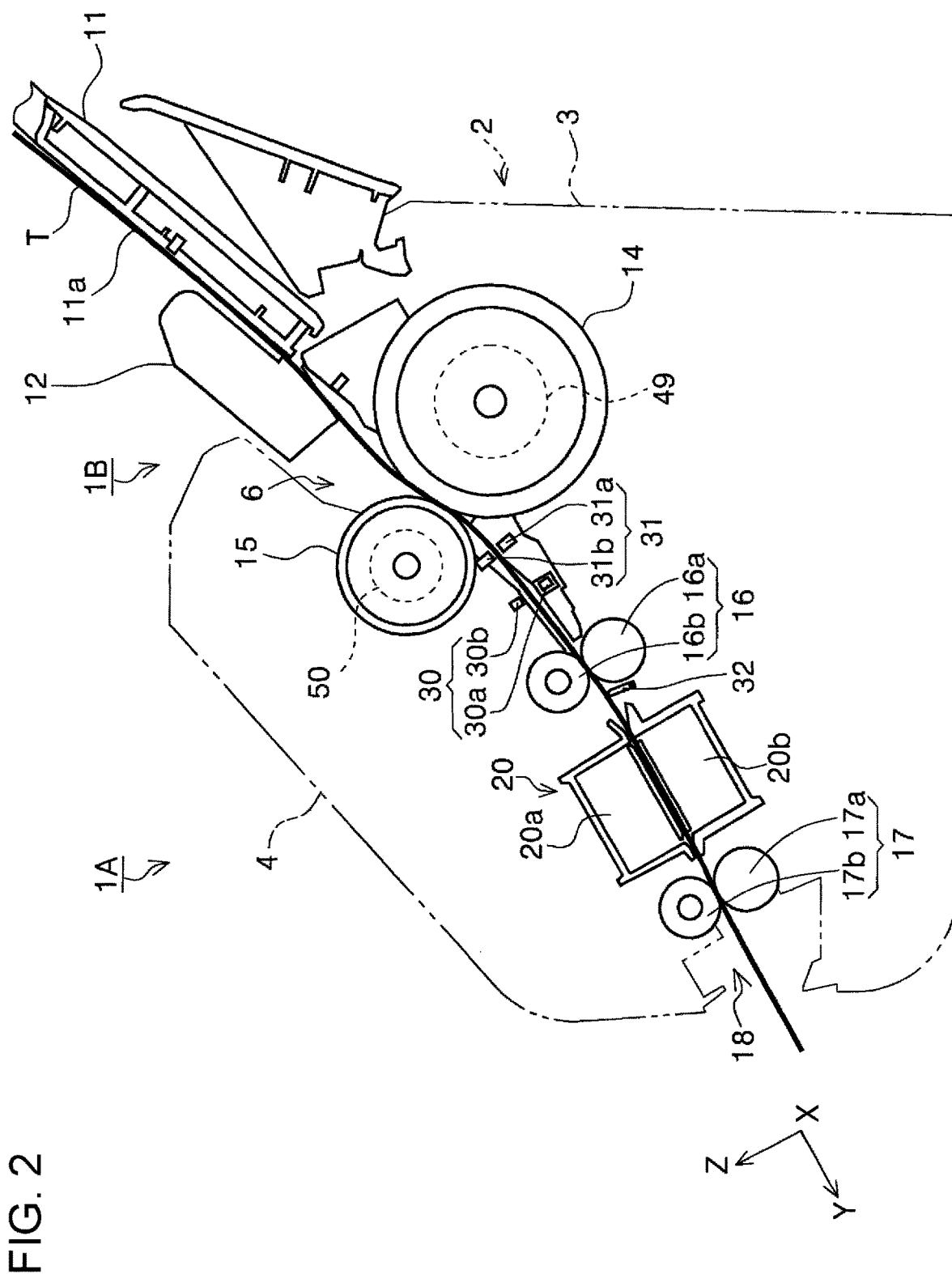
FIG. 2 is a side cross-sectional view showing a document transport path in the scanner.
Figure 3:
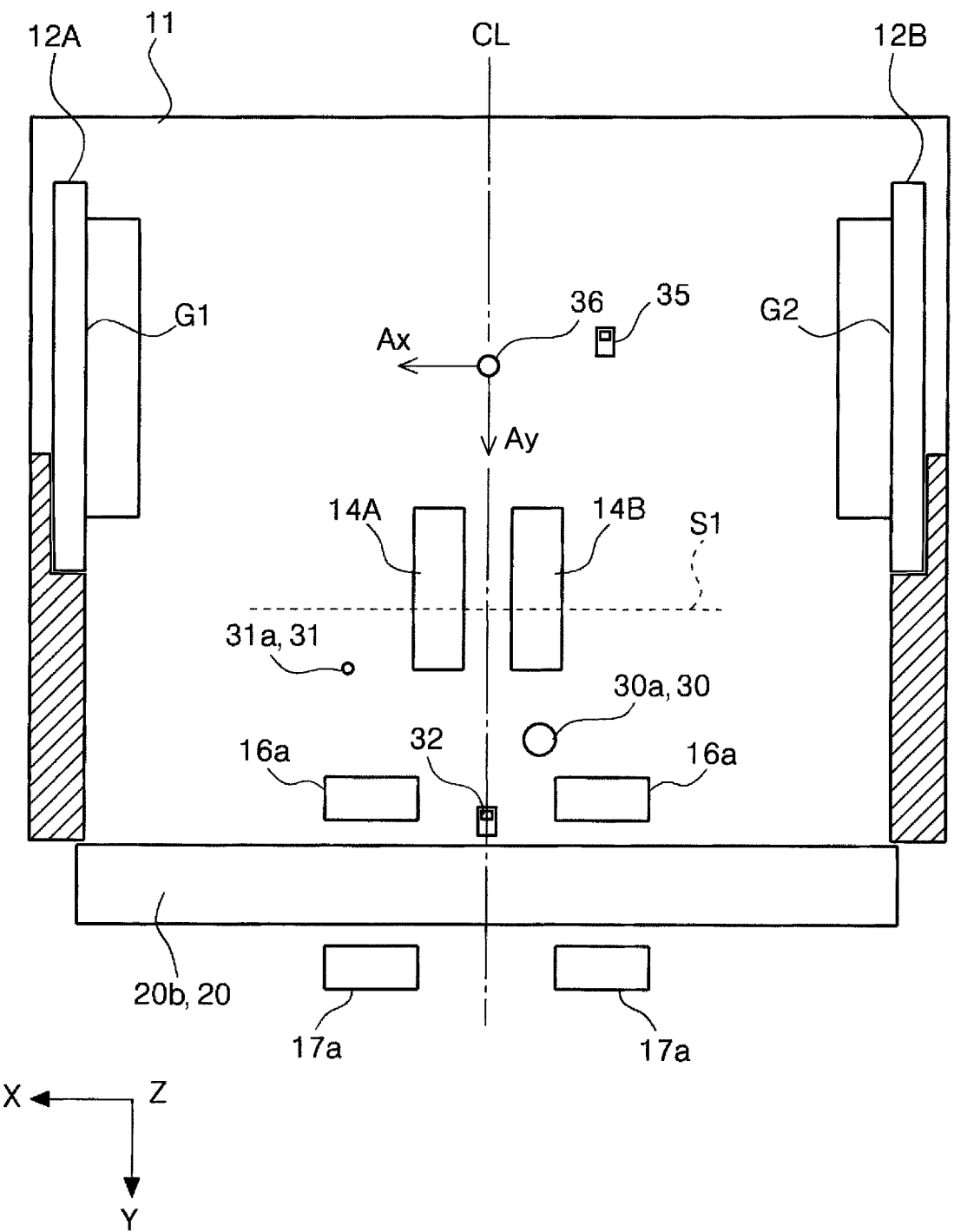
FIG. 3 is a plan view showing a document transport path in the scanner.

Next, the document feed path in the scanner 1A will be described mainly with reference to FIGS. 2 and 3. FIG. 2 is a side cross-sectional view showing a document feed path in the scanner 1A according to the present disclosure, and FIG. 3 is a plan view thereof.

The scanner 1A includes a medium transporting device 1B (FIG. 2). The medium transporting device 1B can be regarded as a device that omits a function related to document reading from the scanner 1A, specifically, a reading section 20 described later. However, even when the reading section 20 is provided, the scanner 1A itself can be regarded as a medium transporting device if attention is paid to the viewpoint of document transportation.

In FIG. 2, a solid line indicated by a symbol T indicates the document feed path, in other words, a passing route of the document P. The document feed path T is a space interposed between the lower unit 3 and the upper unit 4.

The document placement section 11 is provided on the most upstream of the document feed path T. A feeding roller 14 that feeds the document P placed on the placement surface 11a of the document placement section 11 toward the reading section 20, and a separating roller 15 that nips and separates the document P from the feeding roller 14, are provided on the downstream of the document placement section 11.

A pair of the feeding roller 14 and the separating roller 15 is an example of a feeder that feeds the document P downstream.

The feeding roller 14 is in contact with the bottom-most one of the documents P placed on the placement surface 11a of the document placement section 11. Accordingly, when a plurality of documents P are set on the document placement section 11 in the scanner 1A, the documents are fed toward the downstream in order from the document P on the placement surface 11a side.

In the present embodiment, as shown in FIG. 3, two feeding rollers 14 are arranged so as to be symmetrical with respect to the center position CL in the document width direction. In FIG. 3, the feeding roller 14 on the left side with respect to the center position CL is indicated by reference numeral 14A, and the feeding roller on the right side with respect to the center position CL is indicated by reference numeral 14B. Similarly, two separating rollers 15 are also arranged so as to be symmetric with respect to the center position CL although not shown in FIG. 3.

In FIG. 3, a broken line S1 indicates a leading end position of the document P placed on the document placement section 11 before starting feeding. In the leading end of the document P placed on the document placement section 11, a leading end position is regulated at the position S1 by a regulating member (not shown). The regulating member moves to a retreating position when feeding operation starts.

Figure 4:
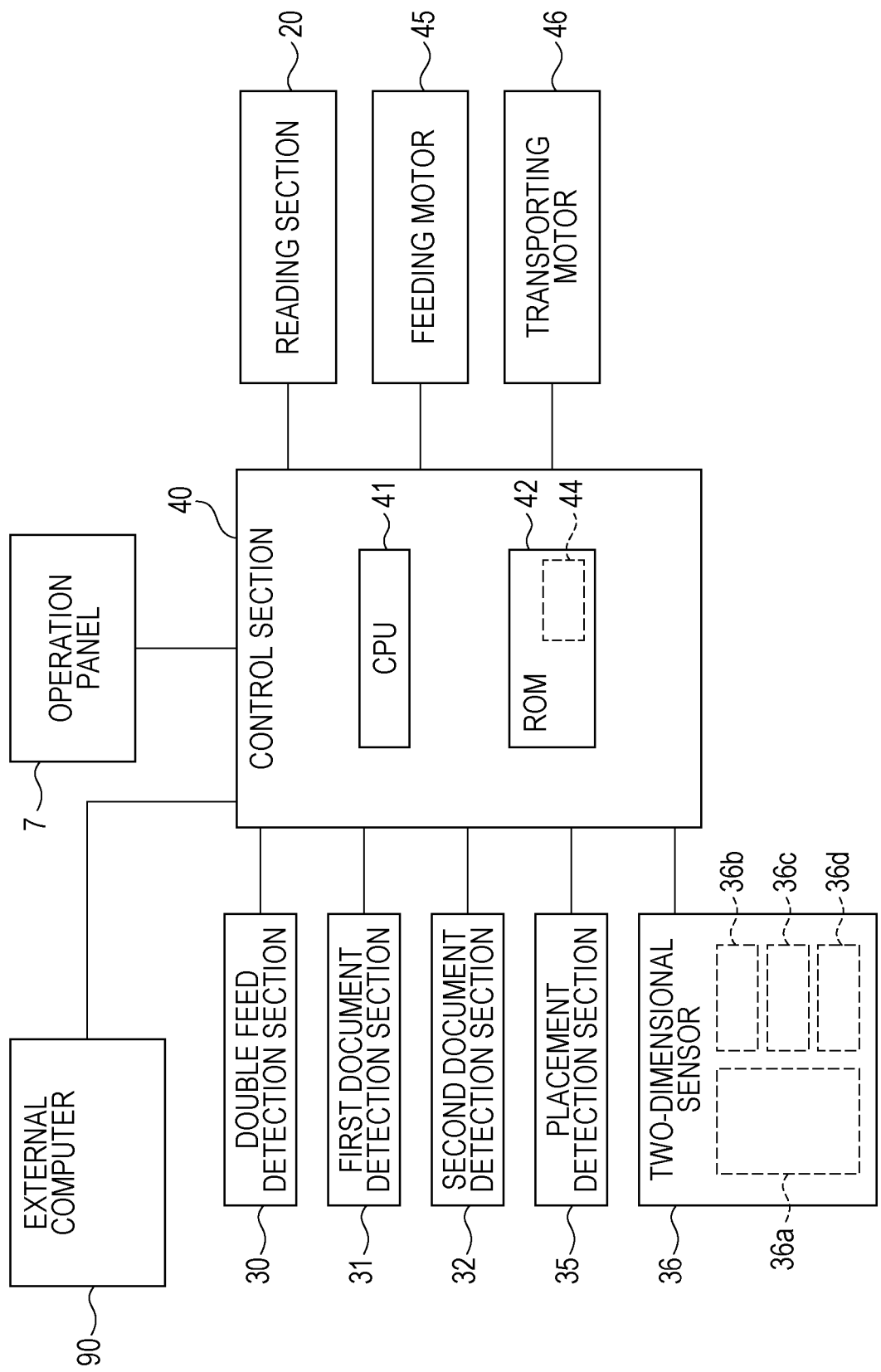
FIG. 4 is a block diagram showing a control system of the scanner.

The feeding roller 14 is rotationally driven by a feeding motor 45 (FIG. 4). Rotational torque is obtained from the feeding motor 45, and the feeding roller 14 rotates counterclockwise in FIG. 2.

The driving force of the feeding motor 45 is transmitted to the feeding roller 14 via a one-way clutch 49. The feeding roller 14 obtains rotational torque from the feeding motor 45 and feeds the document P downstream by rotating in the counterclockwise direction, that is, the forward rotation direction in FIG. 2.

Since the one-way clutch 49 is provided in a driving force transmitting path between the feeding roller 14 and the feeding motor 45 (FIG. 4), even when the feeding motor 45 rotates in the reverse direction, the feeding roller 14 does not rotate in the reverse direction. Further, in a state where the feeding motor 45 is stopped, the feeding roller 14 can be driven to rotate in the forward rotation direction in contact with the document P to be transported.

For example, when the leading end of the document P is detected by a second document detection section 32 disposed downstream of a pair of transporting rollers 16, a control section 40 stops driving the feeding motor 45 and drives only a transporting motor 46. In this way, the document P is transported by a pair of transporting rollers 16, and the feeding roller 14 is in contact with the document P to be transported and is driven to rotate in the forward rotation direction.

Next, rotational torque is transmitted to the separating roller 15 from the transporting motor 46 (FIG. 4) via a torque limiter 50. During the feeding operation of the document P, a driving torque that rotates the separating roller 15 in the reverse rotation direction (counterclockwise direction in FIG. 2) is transmitted to the separating roller 15 from the transporting motor 46 (FIG. 4).

When the document P is not interposed between the feeding roller 14 and the separating roller 15 or when only one piece of document is interposed therebetween, the rotational torque for rotating the separating roller 15 in the forward rotation direction (clockwise direction in FIG. 2) exceeds the limit torque of the torque limiter 50, and as a result, sliding occurs in the torque limiter 50, whereby the separating roller 15 is driven to rotate in the forwarding rotation direction regardless of the rotational torque received from the transporting motor 46 (FIG. 4).

On the other hand, when a second and subsequent document P enters between the feeding roller 14 and the separating roller 15 in addition to the document P to be fed, sliding occurs between the documents, and the separating roller 15 rotates in reverse by the driving torque received from the transporting motor 46 (FIG. 4). As a result, the second and subsequent document P to be double fed are returned upstream, that is, double feeding is prevented.

The feeding roller 14 and the separating roller 15 have outer peripheral surfaces formed of an elastic material such as an elastomer. The relationship of $\mu1 > \mu2$ is established when a friction coefficient between the feeding roller 14 and the separating roller 15 is $\mu1$, a friction coefficient between documents is $\mu2$, a friction coefficient between the feeding roller 14 and the document P is $\mu3$, and a friction coefficient between the separating roller 15 and the document P is $\mu4$. The relationship of $\mu1 > \mu3, \mu4$ is established. The relationship of $\mu2 < \mu3, \mu4$ is established. Further, the relationship of $\mu4 > \mu3$ is established.

Next, the pair of transporting rollers 16 as a feeder, the reading section 20 that reads an image, and a pair of discharging rollers 17 are provided on the downstream of the feeding roller 14. The pair of transporting rollers 16 includes a transport driving roller 16a that is rotationally driven by the transporting motor 46 (FIG. 4) as a transporting motor, and a transport driven roller 16b that is driven to rotate. In the present embodiment, two transport driving rollers 16a are arranged so as to be symmetrical with respect to the center position CL as shown in FIG. 3. Although not shown in FIG. 3, the two transport driven rollers 16b are also arranged so as to be symmetrical with respect to the center position CL.

The document P nipped by the feeding roller 14 and the separating roller 15 and fed downstream is nipped by the pair of transporting rollers 16 and transported to the reading section 20 located on the downstream of the pair of transporting rollers 16. That is, the pair of transporting rollers 16 is an example of the feeder that feeds the document P downstream.

The reading section 20 includes an upper reading sensor 20a provided on the upper unit 4 side and a lower reading sensor 20b provided on the lower unit 3 side. In the present embodiment, the upper reading sensor 20a and the lower reading sensor 20b are configured as a contact image sensor module (CISM) as an example.

The reading section 20 reads an image of at least one of the front and back surfaces of the document P. Thereafter, the document P is nipped by the pair of discharging rollers 17 located on the downstream of the reading section 20 and discharged from a discharging port 18 provided on the front surface side of the lower unit 3 device.

The pair of discharging rollers 17 includes a discharge driving roller 17a that is rotationally driven by the transporting motor 46 (FIG. 4), and a discharge driven roller 17b that is driven to rotate. As shown in FIG. 3, in the present embodiment, two discharge driving rollers 17a are arranged so as to be symmetrical with respect to the center position CL. Similarly, two discharge driven rollers 17b are arranged so as to be symmetrical with respect to the center position CL although not shown in FIG. 3.

The pair of discharging rollers 17 is an example of the feeder that feeds the document P downstream.

Hereinafter, a control system in the scanner 1A will be described with reference to FIG. 4. FIG. 4 is a block diagram showing the control system of the scanner 1A according to the present disclosure.

In FIG. 4, a control section 40 as a controller performs various controls of the scanner 1A including feeding, transporting, discharging, and reading controls of the document P. Signals from the operation panel 7 are input to the control section 40, and signals for realizing display on the operation panel 7 and particularly a user interface (UI), are transmitted from the control section 40 to the operation panel 7.

The control section 40 controls the feeding motor 45 and the transporting motor 46. As described above, the feeding motor 45 is a driving source of the feeding roller 14 illustrated in FIG. 2, and the transporting motor 46 is a driving source of the separating roller 15, the pair of transporting rollers 16, and the pair of discharging rollers 17 illustrated in FIG. 2. The feeding motor 45 and the transporting motor 46 are both DC motors in the present embodiment.

Data to be read is input from the reading section 20 to the control section 40, and a signal for controlling the reading section 20 is transmitted from the control section 40 to the reading section 20.

The control section 40 also receives signals from a placement detection section 35, a two-dimensional sensor 36, a double feed detection section 30, a first document detection section 31, a second document detection section 32, and other detectors, which will be described later.

The control section 40 also receives detection values of an encoder that detects the rotation amount of the feeding motor 45 or encoders that detect the rotation amounts of the transport drive roller 16a and the discharge driving roller 17a. In this way, the control section 40 can detect the amount of document transported by each roller.

The control section 40 includes a CPU 41 and a flash ROM 42. The CPU 41 performs various arithmetic processing according to a program 44 stored in the flash ROM 42, and controls the entire operations of the scanner 1A. Note that a flash ROM, which is an example of a storage section, is a non-volatile memory that can be read and written, and stores data necessary for abnormality determination described later. Unless otherwise specified in this specification, all data necessary for abnormality determination described later, parameters necessary for control, and the like are stored in the flash ROM 42, and values thereof are updated by the control section 40 as necessary. Various setting information input by a user via the operation panel 7 is also stored in the flash ROM 42.

The program 44 stored in the flash ROM 42 does not necessarily mean a single program. The program 44 may be composed of a plurality of programs, including a program for determining an abnormality in the document feed path T and a program for changing a threshold value to be described later. A program for controlling the UI displayed on the operation panel 7, and various control programs necessary for transporting and reading the document P.

The scanner 1A is configured to be connectable to an external computer 90, and information from the external computer 90 is input to the control section 40. The external computer 90 includes a display section (not shown). In the display section, a user interface (UI) is realized by a control program stored in a storage unit (not shown) provided in the external computer 90.

Next, each detector provided in the document feed path T will be described.

First, the document placement section 11 is provided with a two-dimensional sensor 36 as a motion detection sensor. The two-dimensional sensor 36 faces the bottom-most one of the documents P placed on the document placement section 11.

The two-dimensional sensor 36 is a sensor that is based on the same or similar principle as the sensor that can detect the movement of the detection target in a two-dimensional (plane) coordinate system used for a computer mouse, and includes a controller 36a, a light source 36b, lens 36c, and an image sensor 36d.

The light source 36b is a light source for irradiating the document P placed on the document placement section 11 via the lens 36c with light and in this embodiment, laser light is used for the light source 36b. However, a light source such as a red LED, an infrared LED, a laser, a blue LED can be used for the light source 36b, for example. The light source 36b can be switched between a light emitting state and a non-light emitting state by the control section 40.

The lens 36c guides and irradiates the document P placed on the document placement section 11 with light emitted from the light source 36b.

The image sensor 36d is a sensor that receives reflected light from the document P placed on the document placement section 11, and an image sensor such as a CMOS or CCD can be used. The image sensor 36d is configured to arrange pixels along a first axis Ax direction and a second axis Ay direction orthogonal thereto.

In the present specification, the "first axis Ax direction" does not mean only one of the +Ax direction and the −Ax direction, but includes both. Similarly, the "second axis Ay direction" does not mean only one of the +Ay direction and the −Ay direction, but includes both.

The controller 36a analyzes the image acquired by the image sensor 36d, and outputs the movement distance Wx in the first axis Ax direction and the movement distance Wy in the second axis Ay direction of the image as detection values (output values). As an image analysis method for the controller 36a, a known method used for a computer mouse can be used.

As will be described in detail later, the control section 40 that acquires detection values in the first axis Ax direction and the second axis Ay direction from the two-dimensional sensor 36 uses the acquired detection values to determine a transporting state of a document P that is the bottom-most one of the documents P placed on the document placement section 11 and is being fed. Note that the two-dimensional sensor 36 according to the present embodiment outputs the movement distances Wx and Wy in the first axis Ax direction and the second axis Ay direction to the control section 40, and the output values are reset to zero by an initialization instruction from the control section 40.

The two-dimensional sensor 36 has been described as an optical-type as an example, but may be a sensor including mechanical-type, more specifically, a trackball, a rotary encoder that detects the rotation of the trackball in the first axis Ax direction, and a rotary encoder that detects the rotation of the trackball in the second axis Ay direction.

Next, a placement detection section 35 for detecting whether or not the document P exists on the document placement section 11 is provided on the upstream of the two-dimensional sensor 36. In the present embodiment, the placement detection section 35 is configured as a contact-type sensor having a lever, similar to a second document detection section 32 described later, and when the document P is placed, the lever is pushed down, whereby the detection signal sent from the placement detection section 35 changes. Thus, the control section 40 can detect the presence/absence of the document P on the document placement section 11.

The placement detection section 35 may be configured with a light source and a sensor that receives a reflected light component of light emitted from the light source. The control section 40 can detect the presence/absence of the document P on the document placement section 11 based on a difference in reflected light intensity between when there exists a document P on the document placement section 11 and when there is no document P thereon.

The placement detection section 35 can also be configured with an optical-type sensor that includes a light emitting section and a light receiving section.

The first document detection section 31 is provided on the downstream of the feeding roller 14. The first document detection section 31 is configured as an optical sensor as an example, and includes a light emitting section 31*a* and a light receiving section 31*b* disposed to face each other with the document feed path T interposed therebetween as shown in FIG. 2. The light receiving section 31*b* transmits an electric signal indicating the intensity of the detection light to the control section 40 (FIG. 4). When the document P to be transported blocks the detection light emitted from the light emitting section 31*a*, the electrical signal indicating the intensity of the detection light changes, and the control section 40 can detect the passage of the leading end or the trailing end of the document P.

A double feed detection section 30 that detects double feeding of the document P is disposed downstream of the first document detection section 31. As shown in FIG. 2, the double feed detection section 30 includes an ultrasonic wave transmitting section 30*a* and an ultrasonic wave receiving section 30*b* for receiving ultrasonic waves that are disposed to face each other with the document feed path T interposed therebetween. The ultrasonic wave receiving section 30*b* transmits an output value corresponding to the detected ultrasonic wave intensity to the control section 40. When double feeding of the document P occurs, the electrical signal indicating the intensity of the ultrasonic wave changes, and the control section 40 can detect the double feeding of the document P.

The second document detection section 32 is provided on the downstream of the double feed detection section 30. The second document detection section 32 is configured as a contact-type sensor having a lever. When the lever rotates according to the passage of the leading end or the trailing end of the document P, the electrical signal sent from the second document detection section 32 to the control section 40 is changed, whereby the control section 40 can detect the passage of the leading end or the trailing end of the document P. The control section 40 can grasp a position of the document P in the document feed path T by the first document detection section 31 and the second document detection section 32 described above.

Next, an abnormality determination related to the transport of the document P using the two-dimensional sensor 36 will be described. The scanner 1A according to the present embodiment performs an abnormality determination related to the transport of the document P based on a detection value of the two-dimensional sensor 36, and stops transporting the document P as an abnormality occurrence when a predetermined condition is satisfied. In the present embodiment, specifically, the feeding motor 45 (FIG. 4) and the transporting motor 46 (FIG. 4) are stopped.

As described above, the two-dimensional sensor 36 includes the image sensor 36*d* in which pixels are arranged along the first axis Ax direction and the second axis Ay direction orthogonal to the first axis Ax direction. As shown in FIG. 3, the first axis Ax is set to face the X direction, and the second axis Ay is set to face the Y direction.

When an X direction component is generated in the moving direction of the document P due to the skew of the document P, the change in speed in the first axis Ax direction reflects the generation of the X direction component as it is.

Therefore, the control section 40 can determine a transport abnormality based on the detection value of the two-dimensional sensor 36, particularly the detection value (movement distance Wx) in the first axis Ax direction. When it is determined that there exists a transport abnormality, the transport of the document P is stopped. More specifically, the feeding motor 45 (FIG. 4) and the transporting motor 46 (FIG. 4) are stopped.

Figure 5:
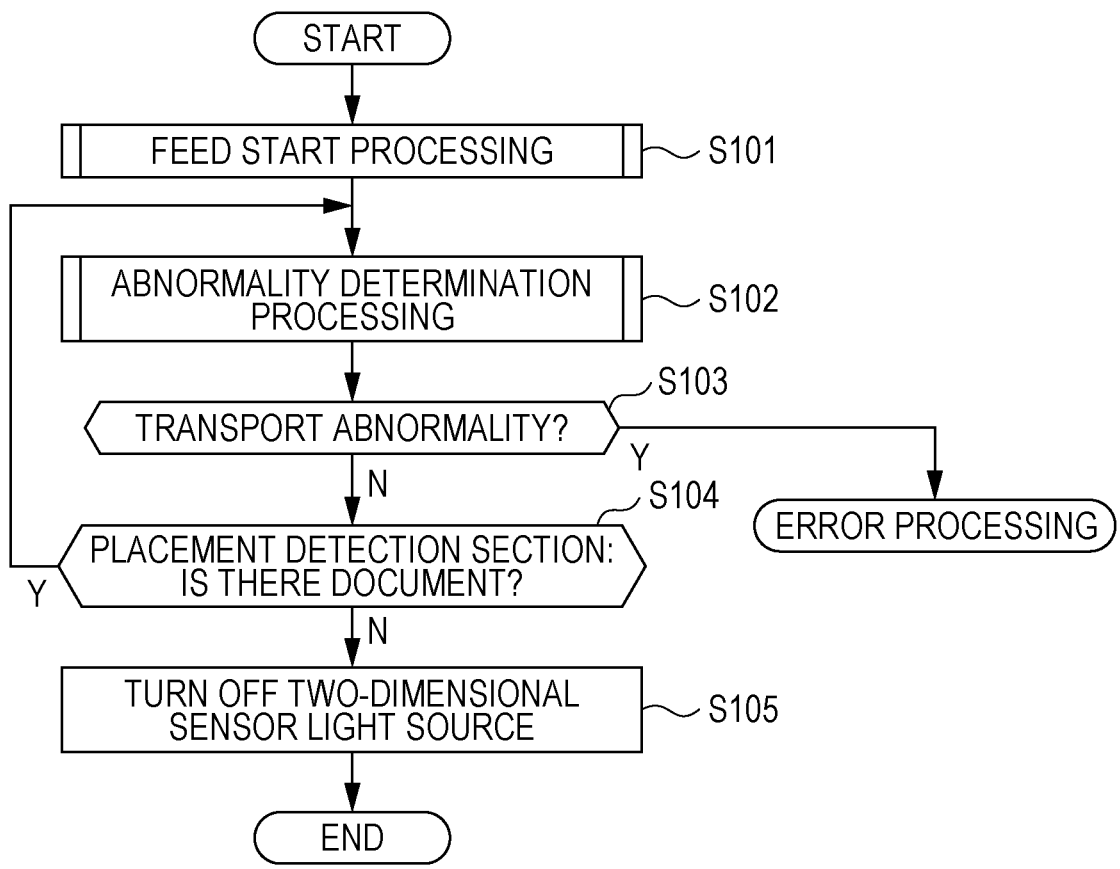
FIG. 5 is a flowchart showing an overall flow of abnormality determination processing during document scanning.

Next, abnormality determination processing at the time of document scanning will be described with reference to FIG. 5. The light source 36*b* as the light emitting section of the two-dimensional sensor 36 is turned off in a scan standby state. When a user executes document scanning in the scan standby state, first, the control section 40 performs feed start processing (step S101). The feed start processing is shown in FIG. 6.

Figure 6:
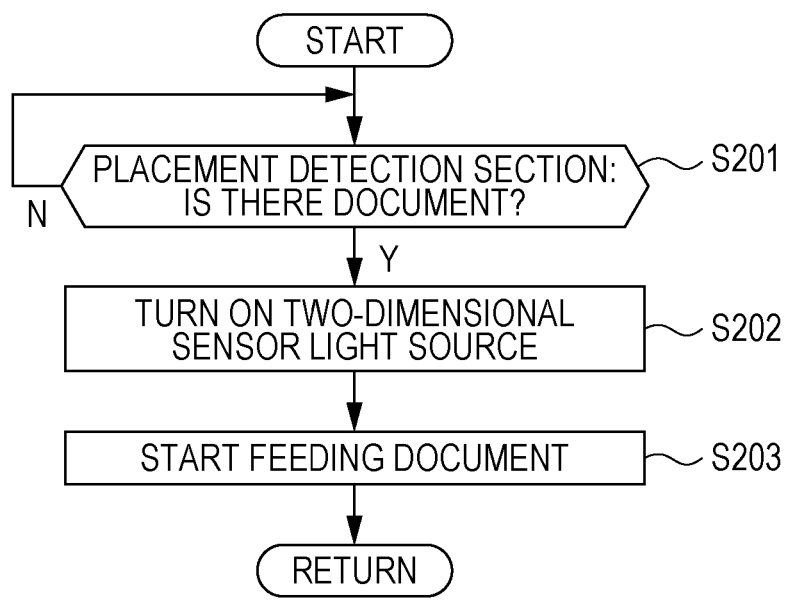
FIG. 6 is a flowchart showing a flow of feed start processing.

As shown in FIG. 6, when the detection information of the placement detection section 35 indicates that the document P is on the document placement section 11 (Yes in step S201), the control section 40 turns on the light source 36*b* of the two-dimensional sensor 36 (step S202), and then drives the feeding motor 45 to start feeding the document P (step S203).

Returning to FIG. 5, the abnormality determination processing is performed (step S102). The abnormality determination processing is shown in FIG. 7.

Figure 7:
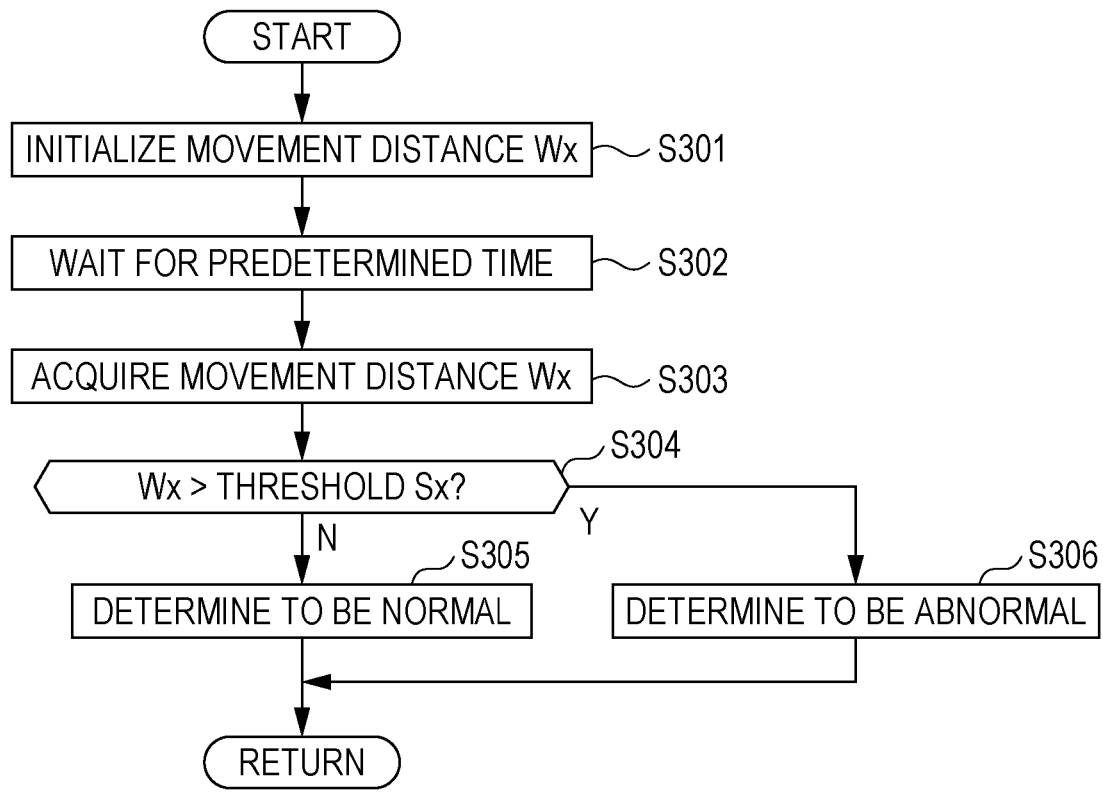
FIG. 7 is a flowchart showing details of the abnormality determination processing.

As shown in FIG. 7, the control section 40 initializes the movement distance Wx of the two-dimensional sensor 36 in the first axis Ax direction (step S301). Next, a predetermined time wait (for example, 10 ms) is performed (step S302), and the movement distance Wx is acquired (step S303). Each time the predetermined time wait (step S302) is performed, that is, each time the movement distance Wx is acquired, the movement distance Wx is initialized. Therefore, the movement distance Wx acquired in step S303 is the movement speed per the predetermined time wait.

Then, the acquired movement distance Wx, in other words, the document movement speed per predetermined time wait is compared with a threshold value (step S304). Specifically, it is determined whether or not the movement distance Wx exceeds the threshold value Sx. When the movement distance Wx exceeds the threshold value Sx (Yes in step S304), the skew of the document P is considered, so it is determined that there exists a transport abnormality (step S306). When the movement distance Wx is less than the threshold value Sx (No in step S304), no transport abnormality occurs and it is determined to be normal (step S305).

Returning to FIG. 5, when it is determined that there exists a transport abnormality (Yes in step S103), error processing is performed. The error processing is illustrated in FIG. 8.

Figure 8:
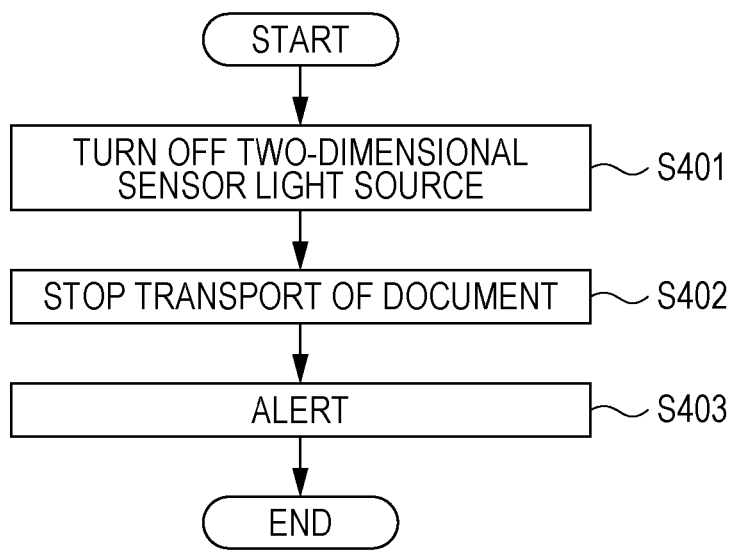
FIG. 8 is a flowchart showing details of error processing.

In FIG. 8, the control section 40 turns off the light source 36b of the two-dimensional sensor 36 (step S401), stops the transport of the document P (step S402), and issues an alert of a transport abnormality occurrence (step S403).

Returning to FIG. 5, when it is determined that there is no transport abnormality (No in step S103), the detection information of the placement detection section 35 is determined (step S104), and when the detection information of the placement detection section 35 indicates that there exists a document P on the document placement section 11 (Yes in step S104), the process returns to step S102 and the subsequent processing is repeated.

When the detection information of the placement detection section 35 indicates that there is no document P on the document placement section 11 (No in Step S104), the control section 40 turns off the light source 36b of the two-dimensional sensor 36 (Step S105).

Here, if detection light is emitted from the light source 36b of the two-dimensional sensor 36 in a state where a document P is not present, there is a risk of erroneous detection when the user touches the vicinity of the two-dimensional sensor 36. As a result, inadvertent transport stoppage is caused and the convenience of the user is reduced. However, as described above, when the detection information of the placement detection section 35 indicates that there is no document P on the document placement section 11, the control section 40 causes the light source 36b of the two-dimensional sensor 36 to be in a non-light-emitting state. Therefore, appropriate document transporting can be realized by suppressing erroneous detection due to the two-dimensional sensor 36.

In the above-described embodiment, since the document detection position by the placement detection section 35 is upstream of the document detection position by the two-dimensional sensor 36 in the document feeding direction, the period during which the two-dimensional sensor 36 emits light in a state where a document P is not present can be minimized.

The document detection position by the placement detection section 35 may be the same position as the document detection position by the two-dimensional sensor 36 in the document feeding direction.

The document detection position by the placement detection section 35 may be downstream of the document detection position by the two-dimensional sensor 36 in the document feeding direction.

The placement detection section 35 may be in the same position as the document detection position by the two-dimensional sensor 36 in the document width direction, or may be in a shifted position.

A number of stacked sheets detector is provided for acquiring information relating to the number of stacked sheets of the documents P on the document placement section 11 when the document detection position by the placement detection section 35 is downstream of the document detection position by the two-dimensional sensor 36 in the document feeding direction. It is also preferable that the control section 40 sets the light source 36b of the two-dimensional sensor 36 to a non-light emitting state when the detection information of the number of stacked sheets detector indicates that the number of documents on the document placement section 11 is one. Thereby, the period during which the two-dimensional sensor 36 emits light in a state where a document P is not present can be eliminated.

Figure 9:
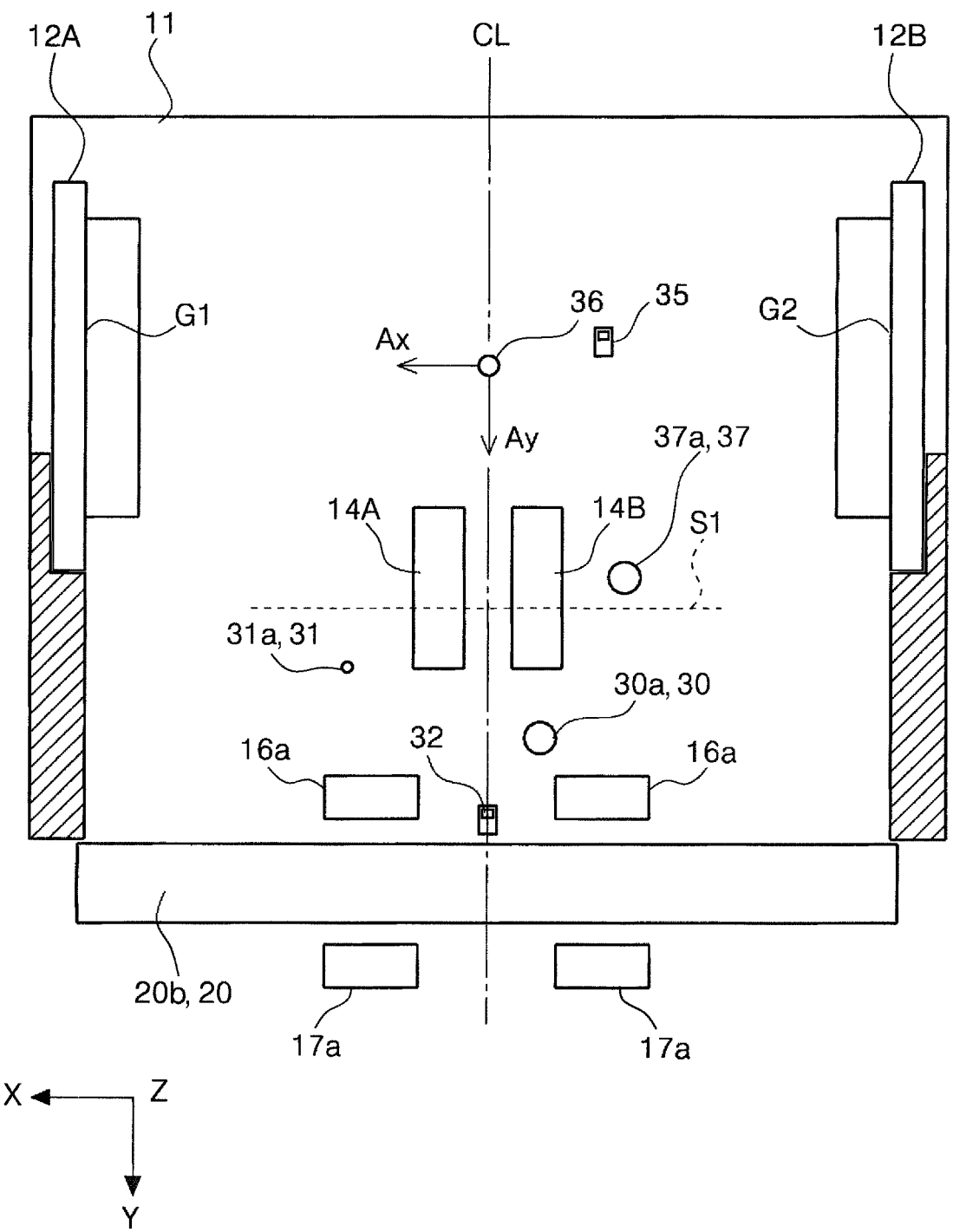
FIG. 9 is a plan view showing a document transport path in the scanner.

An ultrasonic wave detector similar to the above-described double feed detection section 30 can be used for the number of stacked sheets detector. This is because the reception intensity of the ultrasonic wave changes according to the number of stacked sheets of documents P. FIG. 9 shows a disposition example of the number of stacked sheets detector 37, and reference numeral 37a indicates an ultrasonic wave transmitting section. Similar to the double feed detection section 30 described above, the ultrasonic wave receiving section (not shown) is provided in the upper unit 4 so as to interpose the document P to be placed.

In the example of FIG. 9, the number of stacked sheets detector 37 is provided downstream of the document detection position by the two-dimensional sensor 36 in the document feeding direction, but may be at the same position as the document detection position by the two-dimensional sensor 36. Further, it may be provided upstream of the original detection position by the two-dimensional sensor 36. The number of stacked sheets detector 37 may be in the same position as the document detection position by the two-dimensional sensor 36 in the document width direction, or may be in a shifted position as in the example shown in FIG. 9.

When the number of stacked sheets detector 37 is adopted, the above-described placement detection section 35 may be omitted. That is, instead of the placement detection section 35, the number of stacked sheets detector 37 is used.

Figure 10:
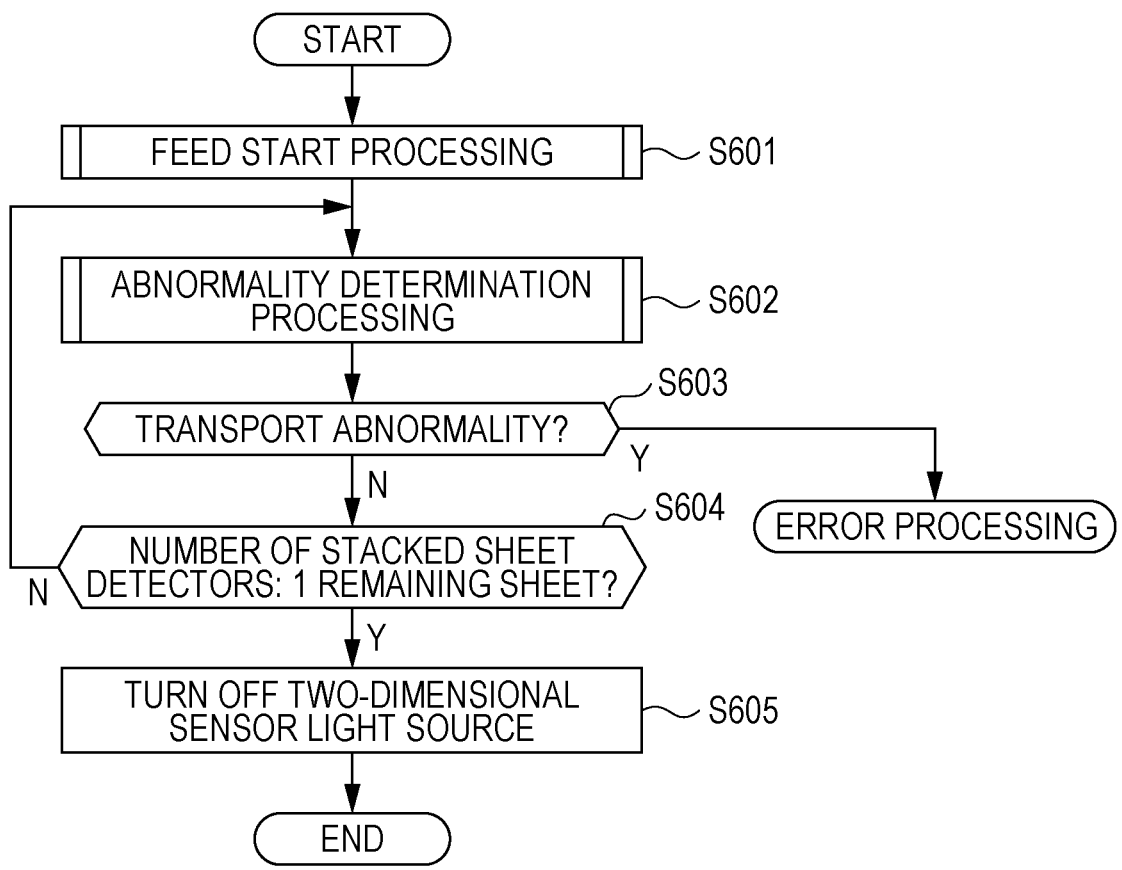
FIG. 10 is a flowchart showing an overall flow of abnormality determination processing during document scanning.

With reference to FIG. 10, an example of control when the number of stacked sheets detector 37 is used will be described.

When document scanning is executed by a user, the control section 40 performs the feed start processing (step S601) and the abnormality determination processing (step S602). The feed start processing (step S601) is the same as the processing in FIG. 6 that is already described, and the abnormality determination processing (step S602) is the same as the processing in FIG. 7 that is already described.

The control section 40 performs error processing when it is determined that there exists a transport abnormality (Yes in step S603). This error processing is also the same as the processing in FIG. 8 already described.

When it is determined that there is no transport abnormality (No in step S603), the detection information of the number of stacked sheets detector 37 is determined (step S604), and when the detection information of the number of stacked sheets detector 37 indicates that there are a plurality of documents on the document placement section 11 (No in step S604), the process returns to step S602 and the subsequent processing is repeated.

When the detection information of the number of stacked sheets detector 37 indicates that there is only one remaining document on the document placement section 11 (Yes in step S604), the control section 40 turns off the light source 36b of the two-dimensional sensor 36. (Step S605).

Note that an encoder for detecting the rotation of the separating roller 15 may be adopted as a number of stacked sheets detector instead of an ultrasonic wave detector. Since the separating roller 15 continuously rotates in the forward rotation direction in contact with the document P when feeding the last document P on the document placement section 11, by detecting such rotation of the separating roller 15, it can be detected that the number of documents on the document placement section 11 is at least the last one.

In the configuration using the placement detection section 35, when the document detection position by the placement detection section 35 is downstream of the document detection position by the two-dimensional sensor 36 in the document feeding direction, the presence/absence of the document P on the document placement section 11 is determined using the two-dimensional sensor 36 itself, and when it is determined that there is no document P, it is also preferable to set the light source 36b of the two-dimensional sensor 36 to a non-light emitting state. Thereby, the period during which the two-dimensional sensor 36 emits light in a state where a document P is not present can be extremely shortened.

In this case, it is preferable that an image of the image sensor 36d (FIG. 4) is output from the two-dimensional sensor 36 to the control section 40, and the control section 40 analyzes the acquired image. For example, when an image in a state where a document P is not present on the document placement section 11 is used as a reference image, and the reference image matches an image acquired during the document scanning, it can be determined that there is no document P on the document placement section 11. The above-described reference image can be acquired in a state where the placement detection section 35 does not detect the document P when the apparatus is turned on, for example.

An example of control in a case where the presence/absence of the document P on the document placement section 11 is detected using the two-dimensional sensor 36 will be described with reference to FIG. 11.

When document scanning is executed by a user, the control section 40 performs the feed start processing (step S501) and the abnormality determination processing (step S502). The feed start processing (step S501) is the same as the processing in FIG. 6 that is already described, and the abnormality determination processing (step S502) is the same as the processing in FIG. 7 that is already described.

The control section 40 performs error processing when it is determined that there exists a transport abnormality (Yes in step S503). This error processing is also the same as the processing in FIG. 8 already described.

When it is determined that there is no transport abnormality (No in step S503), the control section 40 determines the presence/absence of the document P on the document placement section 11 based on the detection image of the two-dimensional sensor 36 (step S504), and when the detection information of the two-dimensional sensor 36 indicates that there exists a document P on the document placement section 11 (Yes in step S504), the process returns to step S502 and the subsequent processing is repeated.

When the detection information of the two-dimensional sensor 36 indicates that there is no document P on the document placement section 11 (No in step S504), the control section 40 turns off the light source 36b of the two-dimensional sensor 36 (step S505).

However, the control section 40 checks the detection information of the placement detection section 35 even when the detection information of the two-dimensional sensor 36 indicates that there is no document P on the document placement section 11 (step S506), and turns on the light source 36b of the two-dimensional sensor 36 (step S507) when the detection information of the placement detection section 35 indicates that the document P is on the document placement section 11 (Yes in step S506). Thereafter, the process returns to step S502 and the subsequent processing is repeated.

That is, since the light source 36b of the two-dimensional sensor 36 becomes a light emitting state when the detection information of the two-dimensional sensor 36 indicates that there is no document P on the document placement section 11 and the detection information of the placement detection section 35 indicates that there exists a document P on the document placement section 11, the control section 40 can continuously detect the motion of the document P by the two-dimensional sensor 36, that is, can detect a transport abnormality even when the information relating to the presence/absence of a document P on the document placement section 11 is incorrect.

Note that when the presence/absence of the document P on the document placement section 11 is detected using the two-dimensional sensor 36, the placement detection section 35 described above can be omitted. An example of control in that case may be said to be an example in which steps S506 and 507 in FIG. 11 are omitted.

The control section 40 interrupts the feeding of the document P from the document placement section 11 when detection information of the placement detection section 35 indicates that there is no document P on the document placement section 11. In addition, the control section 40 can also use a control as shown in FIG. 12 when it is possible to execute a feeding standby mode that waits until the detection information of the placement detection section 35 is changed to the information indicating that a medium is present on the medium placement section. The feeding standby mode can also be referred to as a standby mode. That is, the feeding standby mode is a mode in which when the document P is no longer on the document placement section 11, it waits until the document P is placed next, and when the document P is placed, the document feeding operation is automatically resumed.

In FIG. 12, when document scanning is executed by a user, the control section 40 performs the feed start processing (step S701) and the abnormality determination processing (step S702). The feed start processing (step S701) is the same as the processing in FIG. 6 that is already described, and the abnormality determination processing (step S702) is the same as the processing in FIG. 7 that is already described.

The control section 40 performs error processing when it is determined that there exists a transport abnormality (Yes in step S703). This error processing is also the same as the processing in FIG. 8 already described.

When it is determined that there is no transport abnormality (No in step S703), the detection information of the placement detection section 35 is determined (step S704), and when the detection information of the placement detection section 35 indicates that there exists a document P on the document placement section 11 (Yes in step S704), the process returns to step S702 and the subsequent processing is repeated.

When the detection information of the placement detection section 35 indicates that there is no document P on the document placement section 11 (No in Step S704), the control section 40 turns off the light source 36b of the two-dimensional sensor 36 (Step S705).

Next, when the current feeding mode is the feeding standby mode (Yes in step S706), the control section 40 waits until the detection information of the placement detection section 35 is changed from the information indicating that there is no document P on the document placement section 11 to the information indicating that there exists a document P thereon (No in step S707). When the detection information of the placement detection section 35 is changed from the information indicating that there is no document on the document placement section 11 to the information indicating that there exists a document P thereon (Yes in step S707), the process returns to step S701 and the two-dimensional sensor 36 is set to a light emitting state (step S202 in FIG. 6). As a result, when the feeding of the document P is resumed, it is possible to detect the motion of the document P using the two-dimensional sensor 36, and it is possible to continue to detect a transport abnormality.

The embodiment described above can be modified as follows.

1. In the above-described embodiment, a case where the two-dimensional sensor 36 is applied to a scanner which is an example of an image reading apparatus has been described. However, the two-dimensional sensor 36 can also be applied to a recording apparatus, which is represented by a printer, having a recording head for recording on a medium.

2. In the above-described embodiment, a transport abnormality determination by the two-dimensional sensor 36 may be configured to be switchable between a state where it is executed and a state where it is not executed according to a user setting.

3. In the above-described embodiment, the two-dimensional sensor 36 has the controller 36a (FIG. 4), the controller 36a analyzes an image acquired by the image sensor 36d, and the amount of movement of the image in the first axis Ax direction and the amount of movement in the second axis Ay direction are output to the control section 40 as detection values (output values). However, the control section 40 may be configured to perform the function of the controller 36a.

4. In the above-described embodiment, the feeding roller 14 and the two-dimensional sensor 36 are configured to face the bottom-most document P among the documents P placed on the document placement section 11. However, the feeding roller 14 and the two-dimensional sensor 36 may be configured to face the uppermost document P among the documents P placed on the document placement section 11.

What is claimed is:

1. A medium transporting device comprising:
  a medium placement section on which a medium is placed;
  a feeding roller feeding the medium from the medium placement section;
  a motion detection sensor, that is disposed at a position facing a surface of the medium, and detects a motion of the medium; and
  a controller that stops feeding of the medium based on a detection value received from the motion detection sensor, wherein
  the motion detection sensor is a two-dimensional sensor including a light emitting section and a light receiving section and detecting the motion of the medium in a two-dimensional coordinate system that includes a first axis and a second axis,
  the medium placement section is provided with a number of stacked sheets detector that acquires information relating to a number of stacked sheets of media on the medium placement section, and
  the controller sets a state of the light emitting section to a non-light emitting state when detection information of the number of stacked sheets detector indicates that the number of stacked sheets of media on the medium placement section is one.

2. A medium transporting device comprising:
  a medium placement section on which a medium is placed;
  a feeding roller feeding the medium from the medium placement section;
  a motion detection sensor, that is disposed at a position facing a surface of the medium, and detects a motion of the medium; and
  a controller that stops feeding of the medium based on a detection value received from the motion detection sensor, wherein
  the motion detection sensor is a two-dimensional sensor including a light emitting section and a light receiving section and detecting the motion of the medium in a two-dimensional coordinate system that includes a first axis and a second axis, and
  the controller sets a state of the light emitting section to a non-light emitting state when detection information of the two-dimensional sensor indicates that the medium is absent on the medium placement section.

3. An image reading apparatus comprising:
  a reader that reads a medium; and
  the medium transporting device according to claim 2, which transports the medium toward the reader.

4. The medium transporting device according to claim 2, wherein
  the medium placement section is provided with a placement detector that acquires information relating to a presence/absence of the medium on the medium placement section, and
  the controller sets the state of the light emitting section to the non-light emitting state when detection information of the placement detector indicates that the medium is absent on the medium placement section.

5. The medium transporting device according to claim 4, wherein
  a medium detection position by the placement detector is upstream of a medium detection position by the two-dimensional sensor in a medium feeding direction.

6. The medium transporting device according to claim 4, wherein
  a medium detection position by the placement detector is downstream of a medium detection position by the two-dimensional sensor in a medium feeding direction.

7. The medium transporting device according to claim 6, further comprising:
  a number of stacked sheets detector that acquires information relating to a number of stacked sheets of media on the medium placement section, wherein
  the controller sets the state of the light emitting section to the non-light emitting state when detection information of the number of stacked sheets detector indicates that the number of stacked sheets of media on the medium placement section is one.

8. The medium transporting device according to claim 4, wherein
  the controller sets the state of the light emitting section to a light emitting state when the detection information of the two-dimensional sensor indicates that the medium is absent on the medium placement section and when the detection information of the placement detector indicates that the medium is present on the medium placement section.

9. The medium transporting device according to claim 4, wherein
- the controller is configured to execute a feeding standby mode that waits for feeding of the medium until the detection information of the placement detector is changed to information indicating that the medium is present on the medium placement section from when the detection information of the placement detector indicates that the medium is absent on the medium placement section, and
- the controller sets the state of the light emitting section to a light emitting state when the detection information of the placement detector is changed from information indicating that the medium is absent on the medium placement section to information indicating that the medium is present on the medium placement section, in the feeding standby mode.

10. A transporting control method of a medium transporting device, in which
- the medium transporting device includes
  - a medium placement section on which a medium is placed,
  - a feeding roller feeding the medium from the medium placement section,
  - a motion detection sensor, that is disposed at a position facing a surface of the medium, and detects a motion of the medium, and
  - a controller that stops feeding of a medium based on a detection value received from the motion detection sensor,
- the motion detection sensor is a two-dimensional sensor including a light emitting section and a light receiving section and detecting the motion of the medium in a two-dimensional coordinate system that includes a first axis and a second axis, and
- the medium placement section is provided with a placement detector that acquires information relating to a presence/absence of the medium on the medium placement section, and the transporting control method comprising:
- setting a state of the light emitting section to a non-light emitting state when detection information of the placement detector indicates that a medium is absent on the medium placement section, and
- the controller sets a state of the light emitting section to a non-light emitting state when detection information of the two-dimensional sensor indicates that a medium is absent on the medium placement section.

\* \* \* \* \*